United States Patent
Kumar et al.

(10) Patent No.: US 7,428,414 B2
(45) Date of Patent: Sep. 23, 2008

(54) CROSS TECHNOLOGY ROAMING SOLUTION SYSTEM AND METHOD OF USE

(75) Inventors: Gandarvakottai V. Kumar, Hyderabad (IN); Goutam Kumar Roy, Hyderabad (IN)

(73) Assignee: Megasoft Consultants, Inc., Herndon, VA (US)

( * ) Notice: Subject to any disclaimer, the term of this patent is extended or adjusted under 35 U.S.C. 154(b) by 56 days.

(21) Appl. No.: 11/025,840

(22) Filed: Dec. 30, 2004

(65) Prior Publication Data

US 2006/0148470 A1 Jul. 6, 2006

Related U.S. Application Data

(60) Provisional application No. 60/533,145, filed on Dec. 31, 2003.

(51) Int. Cl.
*H04Q 7/20* (2006.01)

(52) U.S. Cl. .................. 455/432.1; 455/432.2; 455/445; 370/338; 709/238

(58) Field of Classification Search .............. 455/432.1, 455/432.2, 445; 370/401, 467, 471, 338, 370/349; 709/218, 202, 238
See application file for complete search history.

(56) References Cited

U.S. PATENT DOCUMENTS

| 6,097,950 | A | 8/2000 | Bertacchi |
| 6,453,174 | B1 | 9/2002 | Cunningham et al. |
| 6,801,542 | B1* | 10/2004 | Subbiah .................... 370/467 |
| 6,850,510 | B2* | 2/2005 | Kubler et al. ............... 370/338 |
| 6,973,057 | B1* | 12/2005 | Forslow .................... 370/328 |
| 7,010,296 | B2* | 3/2006 | Sakai et al. ............. 455/432.1 |
| 7,072,651 | B2 | 7/2006 | Jiang et al. |
| 2001/0005678 | A1* | 6/2001 | Lee .......................... 455/445 |
| 2004/0037260 | A1* | 2/2004 | Kakemizu et al. ........... 370/338 |
| 2004/0076167 | A1* | 4/2004 | Serroyen .................... 370/401 |
| 2004/0090952 | A1* | 5/2004 | Kubler et al. ............... 370/352 |
| 2004/0215824 | A1* | 10/2004 | Payrits ...................... 709/245 |

FOREIGN PATENT DOCUMENTS

| EP | 1 011 274 A1 | 6/2000 |
| EP | 1 223 781 A2 | 7/2002 |
| EP | 1 313 343 A1 | 5/2003 |
| WO | 00/79827 A1 | 12/2000 |

* cited by examiner

*Primary Examiner*—Danh Le
(74) *Attorney, Agent, or Firm*—Weingarten, Schurgin, Gagnebin & Lebovici LLP

(57) ABSTRACT

The present invention relates to a network-based method and system to control and enable seamless roaming across various cellular network types. The system provides dynamic mapping, processing and conversion of messages to enable seamless communication across various cellular network types. Use of roaming enabled services in non-Roaming Enabled Networks is achieved by integrating this system with the non-Roaming Enabled Network.

20 Claims, 13 Drawing Sheets

FIG.1

| HOME NW \ VISITING NW | CAMEL | INTELLIGENT NW | SERVICE NODE | WIN |
|---|---|---|---|---|
| CAMEL | 100 | 101 | 102 | 103 |
| INTELLIGENT NW | 104 | 105 | 106 | 107 |
| SERVICE NODE | 108 | 109 | 110 | 111 |
| WIN | 112 | 113 | 114 | 115 |

CROSS TECHNOLOGY ROAMING SOLUTION SYSTEM AND METHOD OF USE

This application is related to and claims priority from U.S. Provisional Patent Application Ser. No. 60/524,718 of G. V. Kumar and Goutam Kumar Roy titled, "Cross Technology Roaming Solution System and Method of Use" filed Dec. 31, 2003. The entirety of this patent application is incorporated herein by reference.

BACKGROUND OF THE INVENTION

1. Field of the Invention

The present invention relates to a network-based method and system to control and enable seamless roaming across various cellular network types.

2. Description of the Related Art

Inter-provider roaming (generally referred to herein as "roaming") provides a substantial source of revenue for the mobile communications industry. Thus, the industry is actively searching for systems and methods that promote roaming.

There are at least three types of networks currently prevalent in major parts of the world, namely: Global System for Mobile Communications (GSM), Code Division Multiple Access (CDMA), Time Division Multiple Access (TDMA) (collectively interchangeably referred to herein as "mobile networks" or "wireless networks" or "Cellular Networks"). These network types are differentiated based on the standards on which they operate. Amongst these networks there are further sub-classifications based on the intelligence of the network and its capability to customize network logic. In CDMA technology, there are mainly two types of cellular (also interchangeably referred to herein as "mobile" or "wireless") networks, i.e., Service Node (SN) and Wireless Intelligent Network (WIN) and there are three types of cellular networks under the Global System for Mobile Communications ("GSM"): the Service Node Network—GSM, the Intelligent Network—GSM, and the Customized Application for Mobile Enhanced Logic ("CAMEL") Phase 2 Network—GSM. Unfortunately, it has been observed that intelligent networking between wireless networks is more complex than intelligent networking between fixed networks due, at least in part, to the dynamic nature of mobile communications. Thus, wireless intelligent networking requires complex and intelligent mobility management.

The CAMEL and WIN2 (also interchangeably referred to herein as "Roaming Enabled Network Intelligence Technologies") are network intelligence technologies that extend traditional intelligent network services found in fixed networks into mobile networks. Roaming Enabled Network Intelligence Technologies allow providers to provide value-added services to the mobile subscribers roaming in home public land mobile network ("HPLMN") and visiting public land mobile network ("VPLMN") by the HPLMN network operator. Inherently, Roaming Enabled Network Intelligence Technologies requires that the controlling function must interact with a switching function in a foreign network, which is a significant obstacle in the conventional marketplace.

Presently, Roaming Enabled Network Intelligence Technology services are mainly utilized in the circuit-switched domain. However, it should be noted that industry initiatives are being made to bring the same services to the packet-switched domain.

Roaming Enabled Networks (RENs) offer seamless roaming to prepaid and postpaid subscribers across all Roaming Enabled Networks. However, not all users of mobile technology have access to Roaming Enabled Networks. At the time of this invention, very few cellular networks are roaming-enabled. Hence, the majority of cellular networks, including Intelligent Network—GSM or Service Node Network—GSM/CDMA, are non-roaming compliant or non-roaming enabled. Non-roaming compliant networks do not allow the mobile end user (also known herein as the "subscriber") to take advantage of seamless roaming across cellular networks. Accordingly, non-roaming enabled subscribers cannot readily access roaming services without experiencing inconveniences, such as the inability to operate or connect wireless communications between end users, particularly in areas of non-Roaming Enabled Networks.

Upgrading these networks into a Roaming Enabled Network requires a large investment of capital by the provider. Generally, in view of the costs, providers typically have chosen not to upgrade or become roaming-enabled.

Roaming Enabled Network Intelligent Technologies provide numerous benefits to subscriber roaming. A Roaming Enabled Network includes subscription information (SI) interchangeably referred to as "Trigger Lists". For example, in GSM—CAMEL, subscription information is known as CAMEL Subscription Information ("CSI"). Subscription information indicates the service to which the user has subscribed (i.e., prepaid/post paid) and the location in which the service is subscribed (i.e., corresponding to which service control point ("SCP") is responsible for the service control). In the Roaming Enabled Network equipped with Si, prepaid service, for example, can be triggered and routed to a roaming-enabled SCP for further handling.

A major drawback of this technology in the prepaid environment is the method in which the service is triggered. Si is not applicable on all the networks (i.e., not all mobile switching centers ("MSCs") support SI). The lack of Roaming Enabled Networks limits the applicability of this technology.

Consequently, there is a need for a low-cost method of facilitating roaming among wireless networks without necessitating wholesale conversion of wireless networks and incurring the high costs associated therewith. There is also an unmet need for an alternative service triggering that is supported by a wide range of MSCs.

SUMMARY OF THE INVENTION

The present invention meets the unmet needs in the art by providing a network-based, cross-technology roaming solution (also referred to herein as the "system") for controlling the routing of wireless communication signals with a protocol layer message replication technique usable over various wireless networks. The present invention is fully scalable and customizable, is operable using industry standard applications, and is implemented at the network level.

The system and method enable the mobile industry to leverage the benefits of Roaming Enabled Networks to its entire subscriber base and to other providers. More specifically, this system and method meet the existing need for seamless national and international roaming across various mobile networks, including Service Node Network—GSM, Intelligent Network—GSM, CAMEL Phase 1 Network—GSM, CAMEL Phase 2 Network—GSM, Service Node Network—CDMA, Wireless Intelligent Network Phase 1—CDMA and Wireless Intelligent Network Phase 2—CDMA networks. The present invention benefits the entire spectrum of cellular network providers, including non-roaming compliant mobile networks. The system of the present invention allows end users, who roam into a cellular network, to enjoy roaming-enabled services. Features of the method and system the present invention are applicable to all wireless networks, thereby providing wide applicability and the potential for service benefits for users and economic benefits for providers.

In one embodiment, the system of the present invention affects mobile-originated ("MO") and mobile-terminated ("MT") services like voice/data. The system intercepts the signals of roaming subscribers and processes them to facilitate roaming enablement. Thus, the system of the present invention makes it possible for existing non-roaming-enabled networks to handle roaming subscribers (in-roamers and out-roamers) from any cellular network provider.

In one embodiment of the present invention, the Intelligent Network, Service Node Network or Roaming Enabled Network implements a system and a method involving a message replication technique at the protocol layer. Each message from the source network is mapped with the target network type message and a dynamic conversion of the message takes place as per the target network type. In order to achieve seamless communication over a set of messages, the present invention stores information and applies business process rules on this information replicating the functionality of source and/or target networks. After selecting the target message type, the message is further loaded/trimmed with target network-specific information by applying business process rules. When the conversion is completed, the message is sent to the target network.

Additional advantages and novel features of the invention will be set forth in part in the description that follows, and, in part, will become more apparent to those skilled in the art upon examination of the following or upon learning by practice of the invention.

BRIEF DESCRIPTION OF THE DRAWINGS

FIG. 1 provides a chart illustrating exemplary scenarios in which the present system is applicable in accordance with one embodiment of the present invention;

Figure 2:
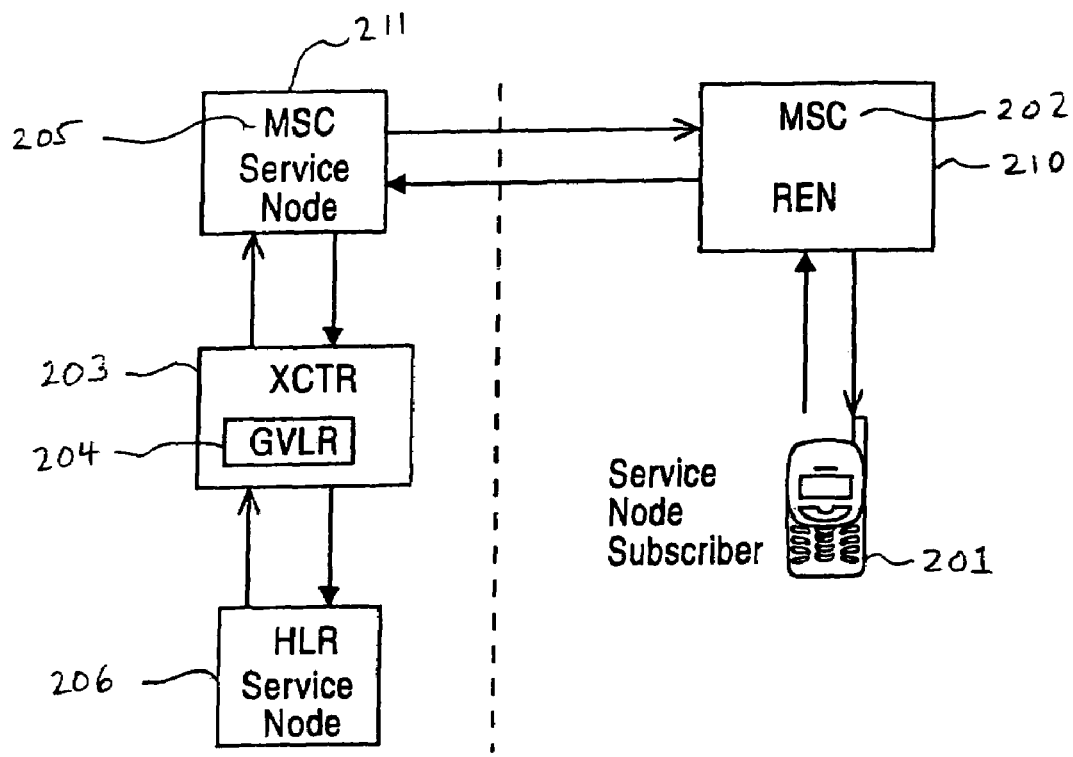
FIG. 2 illustrates a schematic of the deployment and functioning of the system, wherein the home network is a Service Node Network and the visiting network is a Roaming Enabled Network in accordance with one embodiment of the present invention.

Other features of the present invention will become apparent from the following detailed description considered in connection with the accompanying drawings which disclose multiple embodiments of the present invention. It should be understood, however, that the drawings are designed for the purpose of illustration only and not as a definition of the limits of the invention. Additional advantages and novel features of the invention will also become apparent to those skilled in the art upon examination of the following or upon learning by practice of the invention.

DETAILED DESCRIPTION OF THE PRESENT INVENTION

The present invention relates to a network-based system for controlling interaction and compatibility between various mobile networks. The present invention offers seamless national and international roaming to users of various wireless networks.

The present invention is a solution that does not require substantial capital as would be required in a complete conversion of a provider's infrastructure. Thus, the present invention is an economical and efficient method of implementing cross-technology roaming. As a result, this invention presents an opportunity for providers involved with providing roaming and interconnection to increase their roaming revenue generation.

Wireless intelligent networking involves the concept of a "query/response" system. This system operates on the principles of distributed intelligence, wherein a datastore is queried for information necessary for call processing. For example, a mobile communication switch or Mobile Switching Center (MSC) that is equipped with mobile intelligence networking call logic can launch a message or "query" to a datastore hosted by a network element known as a Service Control Point (SCP). The SCP processes the request and issues a "response" to the MSC so that it may continue processing, such as the processing required for wireless telephone calls. Generally, the SCP is a physical entity that implements a Service Control Function (SCF). For example, the SCP may respond to queries through the common channel signaling system 7 ("SS7"). The SCP can initiate SS7 instructions in its response.

The present invention is compatible and usable with all networks available. The present invention may be integrated with the infrastructure (e.g., MSC) of each network in one variation. In another variation, the system communicates with the infrastructure of the provider via industry standard protocol, such as SS7 or Transmission Control Protocol (TCP)/ Internet Protocol (IP).

The functionality and operation of the present invention is illustrated by way of examples and permutations (referred to herein as "scenarios") of roaming (referred to herein as "visiting" or "visited") providers and home providers having one of the following networks: WIN/ CAMEL; Intelligent Network, or Service Node Network. However, the scope of the invention is not limited to the network types defined in these examples.

FIG. 1 illustrates some of the exemplary scenarios. However, the scope of the invention is not limited to the network types defined in these examples. The following description of the present invention discloses exemplary implementations of some of the possible scenarios with respect to roaming compliance. It should be understood by one skilled in the art, however, that the present invention can be adapted to fit networks not specifically identified in this application, such as GSM/CDMA/TDMA networks developed in the future, but compatible with current GSM/CDMA/TDMA networks.

Prior to describing the various scenarios, terms used herein are defined. A "location update" is defined as a process of receiving authentication from a home network for using a given network infrastructure (can be both home as well as visiting). For the purpose of description, the service explained in the examples or scenarios is limited to voice service. However, the invention is applicable to various mobile originating and terminating services like voice, video or data. For the purposes of this application, "mobile originated" (MO) describes a call or data transfer that originates at a mobile device and "mobile terminated" (MT) describes a call or data transfer that terminates at a mobile device. "In-roamers" are subscribers of another Mobile Network visiting this Mobile Network. "Out-roamers" are subscribers of the Home Network visiting in another Mobile Network.

FIG. 2 presents a scenario where the home network is a Service Node Network and the roaming network is a Roaming Enabled Network (REN). This scenario is represented by either of boxes 108 or 111 of FIG. 1.

A subscriber 201 of a Service Node Network home provider 211 is roaming in a Roaming Enabled Network, i.e., the network used by the roaming provider 210. In order to access the roaming provider 210 to place a call, for example, the subscriber 201 sends a signal to a MSC 202 of the roaming provider 210. The roaming provider 210 seeks a location update. For location update processing, the Roaming Enabled Network MSC 202 of the roaming provider 210 sends (delegates) a request to the Cross Technology Roaming system 203 of the present invention. The system 203 communicates with the gateway visitor location register (GVLR) 204, which is generally a node between the visitor location register (VLR) and the home location register (HLR), by using home network MSC 205. The GVLR 204 optimizes the location updating and the processing of subscriber profile data across networks. In one variation, the GVLR 204 is integrated with the system 203. It should be noted that the GVLR process is similar in each subsequently discussed scenario.

The system 203 receives the request, translates the request, and in turn, forwards the request to the MSC 205 of the home (service node) network provider 211. The MSC 205 communicates with the HLR 206 of the home provider 211 to obtain Subscriber Information Data (SI) from the roaming-enabled HLR 206.

The home provider 211 responds to the request in the reverse direction, via the Home MSC 205 and the GVLR 204, to the system 203. The system 203 communicates with the MSC 202 which communicates with the subscriber 201. In one variation, this process occurs in real time.

When an in-roamer places a MO wireless communications signal, e.g., places a telephone call (also known herein as a "call") from the Roaming Enabled Network, the call is routed from the MSC 202 to the system 203.

The system 203 interacts with the Service Node Network using either of SS7 or Transmission Control Protocol (TCP)/ Internet Protocol (IP) and requests the account balance of the subscriber. On receipt of the balance, the system calculates the talk time based on the subscriber profile definition (also known as rate plan). After arriving at the talk time, a timer is set by the system and invokes a 'go' signal for call processing.

In a MT call with in-roamers, the call lands at the service node home MSC 205, and, depending on the roaming subscriber's 201-location information from the home service node HLR/VLR 206, the call is patched to the visitor MSC 202 via the system 203. The system 203 converts the protocol of the service node messages to the appropriate roaming-enabled technology messages.

In a MO call with out-roamers and in a MT call with out-roamers, the system 203 acts as a SCP and assists in real-time charging by invoking the apply charging mechanism. Since the subscriber real-time balance is constantly updated to the home network and on the home network go signal for call processing or extension, the roaming network 210 conducts fraud-free charging of the roaming subscriber.

Figure 9:
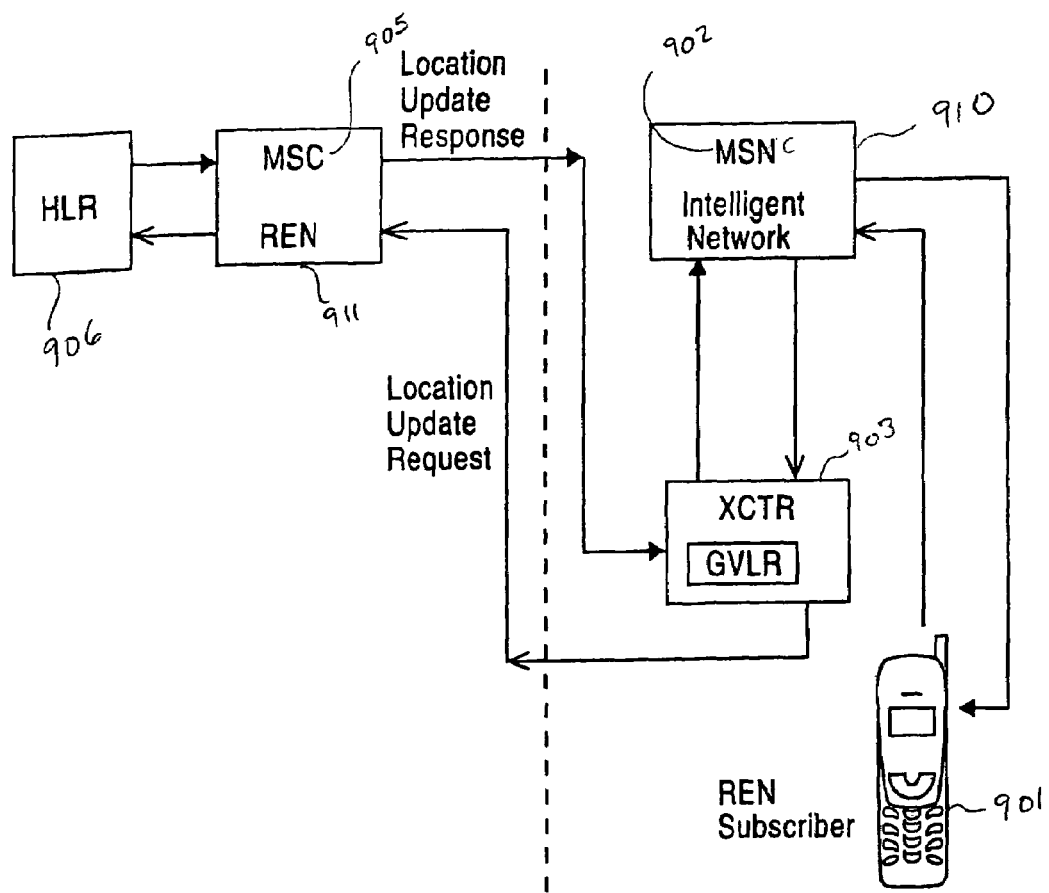
FIG. 9 illustrates a schematic of the deployments and functioning of the system when the home network is roaming-enabled and the visiting network is an Intelligent Network in accordance with one embodiment of the present invention.

Another scenario is one in which the home network 911 is a Roaming Enabled Network and the roaming network 910 is an Intelligent Network. This scenario is illustrated by box 101 or box 113 shown in FIG. 1. As shown in FIG. 9, for location update processing, the MSC 902 of the visiting Intelligent Network 910 receives a request signal from the roaming subscriber 901 and defers the processing request to the system 903. The system 903 forwards the same request to the Roaming Enabled Network MSC 905, which, in turn, locates the roaming-enabled subscriber 901 information from the roaming-enabled home HLR 906.

When an in-roamer makes a MO call from the Intelligent Network 910, the call is routed to the system 903 using Intelligent Network MSC 902. The system 903 directly interacts with the SCP of the Roaming Enabled Network. Upon receiving the approval signal from the system 903, the SCP subsequently invokes the "apply charging" mechanism and facilitates real-time, fraud-free charging of the roaming-enabled subscribers 901. Thus, the system 903 maintains the link with the Roaming Enabled Network SCP.

For a MT call with in-roamers, the call lands at the roaming enabled home MSC 905 and, depending on the roaming subscriber's 901 location information from the home HLR/VLR 906, the call is patched to the visitor MSC 902 via the system 903. The system 903 performs the protocol conversion of roaming-enabled messages to corresponding Intelligent Network messages.

In a MO call with out-roamers and a MT call with in-roamers, the system 903 acts as a SCP and facilitates real-time charging by invoking apply charging, which allows the visitor Roaming Enabled Network 910 to accomplish fraud-free charging of the roaming subscriber 901.

Figure 10:
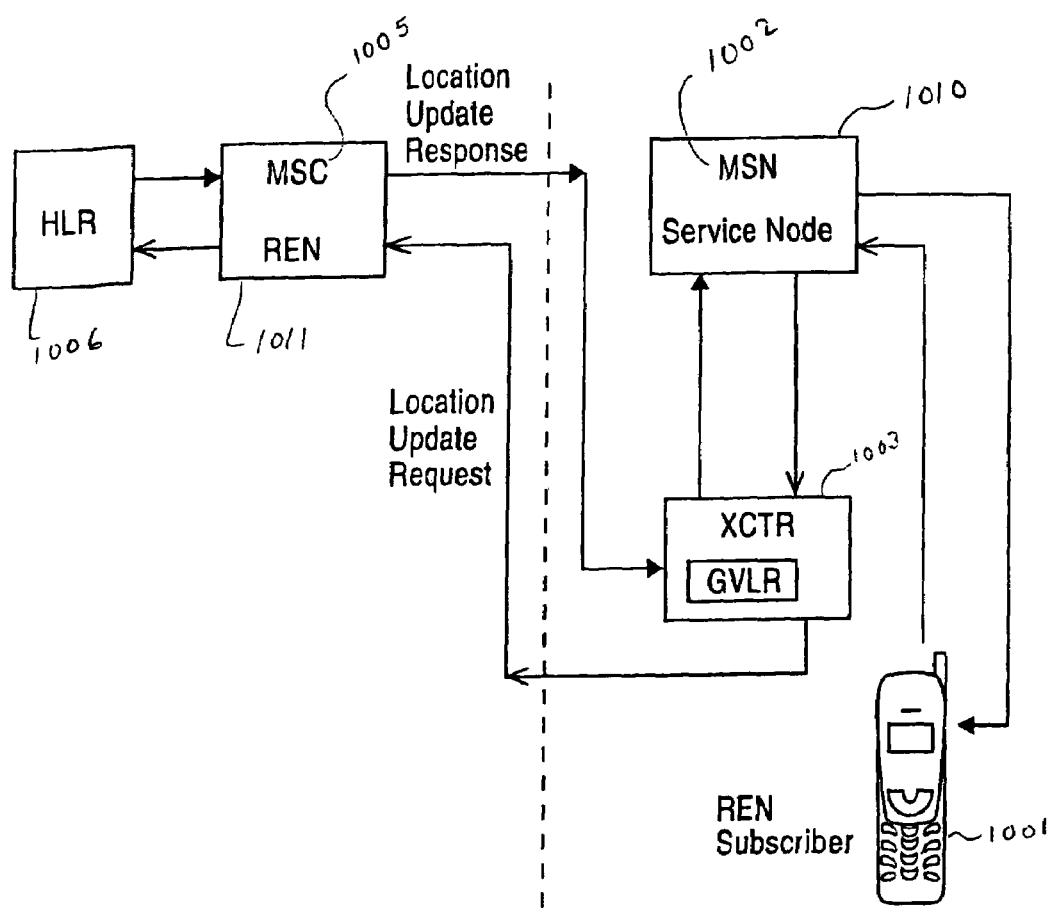
FIG. 10 illustrates a schematic of the deployments and functioning of the system when the home network is roaming-enabled and the visiting network is a Service Node Network in accordance with one embodiment of the present invention.

Another scenario is one in which the home network 1011 is a Roaming Enabled Network and the roaming network 1010 is a Service Node Network. This scenario is represented by box 102 or box 114 shown in FIG. 1. As shown in FIG. 10, for location update processing, the MSC 1002 of the visiting Service Node Network 1010 receives a request signal from the roaming subscriber 1001 and sends the processing request to the system 1003. The system 1003 translates and forwards the same request to the Roaming Enabled Network MSC 1005, which, in turn, locates the roaming-enabled subscriber 1001 information from the roaming-enabled home HLR 1006.

When an in-roamer makes a MO call from the Service Node Network 1010, the call is routed to the system 1003 using Service Node Network MSC 1002. The system 1003 directly interacts with the SCP of the Roaming Enabled Network. Upon receiving the approval signal from the system 1003, the SCP subsequently invokes the "apply charging" mechanism and facilitates real-time, fraud-free charging of the roaming-enabled subscribers 1001. Thus, the system 1003 maintains the link with the Roaming Enabled Network 1010 SCP.

For a MT call with in-roamers, the call lands at the roaming enabled home MSC 1005 and, depending on the roaming subscriber's 1001 location information from the home HLR/VLR 1006, the call is patched to the visitor MSC 1002 via the system 1003. The system 1003 performs the protocol conversion of roaming-enabled messages to corresponding Service Node Network messages.

In a MO call with out-roamers and a MT call with in-roamers, the system 1003 acts as a SCP and facilitates real-time charging by invoking apply charging, which allows the visitor Roaming Enabled Network 1010 to accomplish fraud-free charging of the roaming subscriber 1001.

Figure 8:
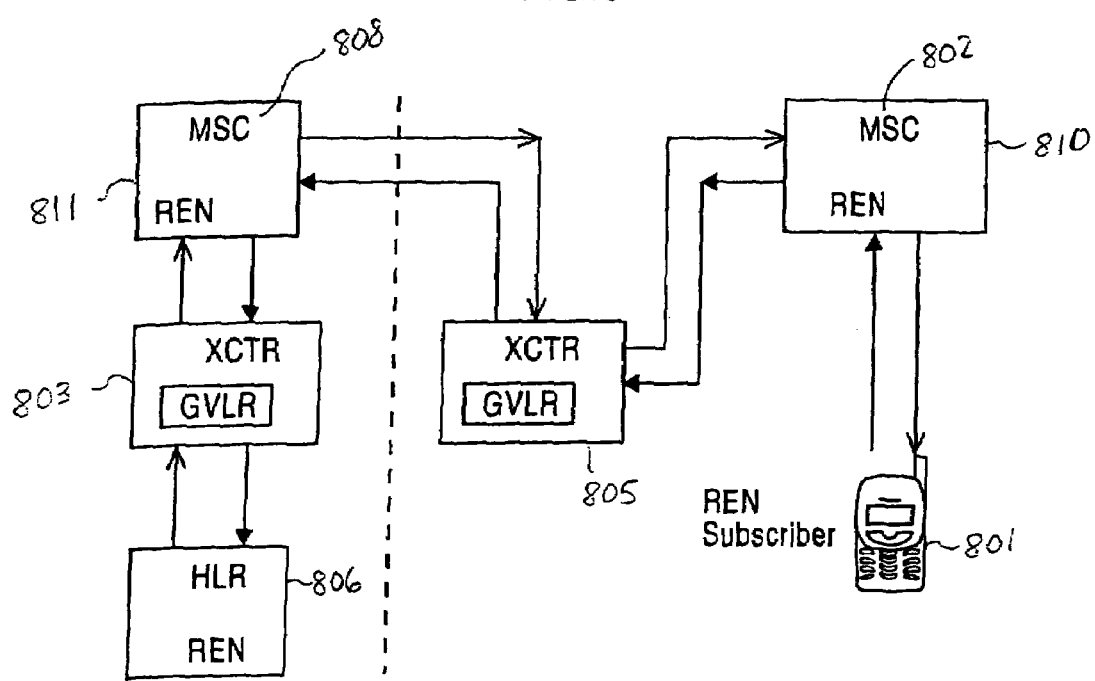
FIG. 8 illustrates a schematic of the deployment and functioning of the system, wherein the home network is roaming-enabled and the visiting network is roaming-enabled in accordance with one embodiment of the present invention.

In yet another scenario, as depicted in FIG. 8, the home network 811 is a Roaming Enabled Network with the system 803, and the visited network 810 is a Roaming Enabled Network equipped with the system 805. This scenario is represented by any of boxes 100, 103, 112 or 115 shown in FIG. 1.

For the location update process, the Roaming Enabled Network subscriber 801 communicates a signal to a Roaming Enabled Network MSC 802, which then forwards the signal to the system 805. The system 805 forwards the request to the home Roaming Enabled Network MSC 808 so that it can obtain subscriber information from the roaming-enabled home HLR 806 using system 803. The signal is then reversed and sent back to the visiting MSC 802.

When an in-roamer makes a MO call from the Roaming Enabled Network 808, the call is processed by the Roaming Enabled Network MSC 802 and the system 805. The system 805 interacts with the system 803 of the home Roaming Enabled Network 810 via the home MSC 808. The home system 803 acts as a SCP and invokes the apply charging mechanism, thereby approving and facilitating real-time and fraud-free charging of the roaming enabled subscribers 801 by the visiting system 810. The system 805 maintains a link with the Roaming Enabled Network home system 803, which, as stated, acts as a SCP in this scenario.

For a MT call with in-roamers, the call is processed and is directed to the Roaming Enabled Network home MSC 808, and depending on the roaming subscriber's 801 location information from the Roaming Enabled Network home HLR/VLR 806, the call is patched to the visiting MSC 802 via the systems 805 of the visiting network and 803 of the home network. The systems 805 and 803, respectively, perform the appropriate protocol conversion pertaining to the signaling messages. Moreover, the Roaming Enabled Network MSC 802 invokes the "follow-me" function for the call control. The MT call is fully controlled by the Roaming Enabled Network home SCP.

For MO calls and MT calls with out-roamers, the system 803 acts as a SCP and helps in real-time charging by invoking apply charging. This functionality helps the visited Roaming Enabled Network 810 accomplish fraud-free charging of the roaming subscriber 801. In one variation, the MT call is fully controlled by the home Roaming Enabled Network system 803 which acts as the SCP.

Figure 7:
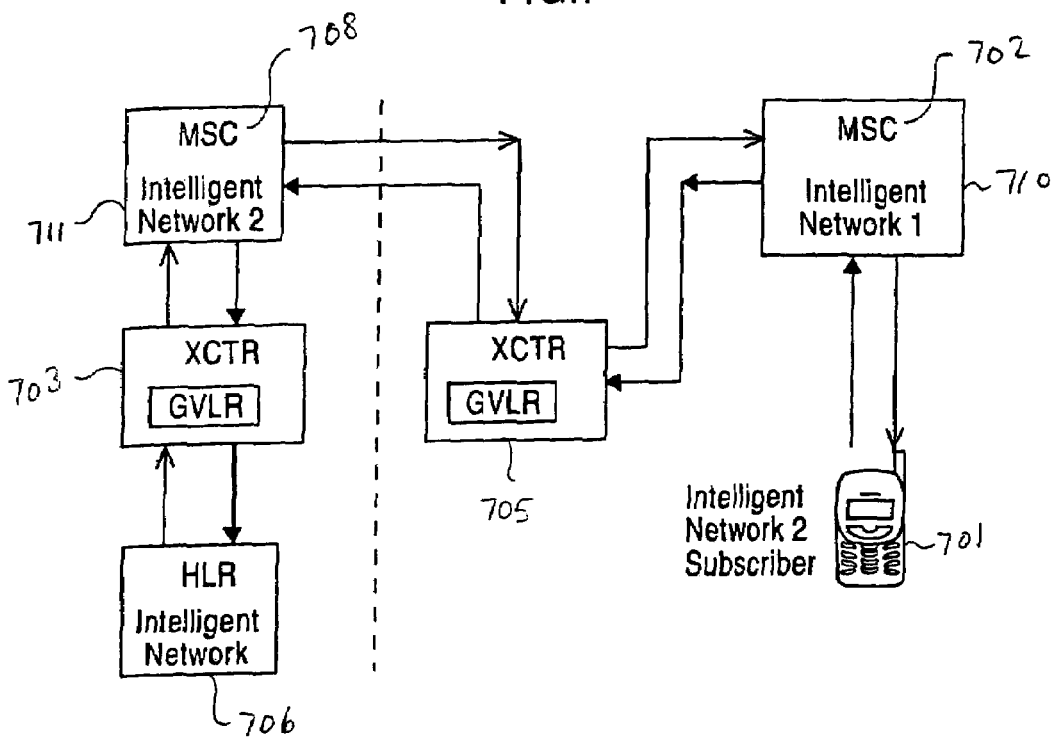
FIG. 7 illustrates a schematic of the deployment and functioning of the system, wherein the home network is an Intelligent Network and the visiting network is an Intelligent Network in accordance with one embodiment of the present invention.

FIG. 7 illustrates the scenario shown in box 105 of FIG. 1. In FIG. 7, the home network 711 is an Intelligent Network equipped with the system 703, and the visited network 710 is an Intelligent Network equipped with the system 705.

For the location update process, the subscriber 701 sends a signal to the MSC 702 of the visiting Intelligent Network 710, which submits a request to the system 705. The system 705 transmits the request to the home network MSC 708. The home network MSC 708 locates and obtains the subscriber 701 information from the Intelligent Network home HLR 706 using system 703. The signal is then reversed and sent back to the visiting MSC 702 via the system 705.

When an in-roamer makes a MO call from the visited Intelligent Network, the call is forwarded from the Intelligent Network MSC 702 to the system 705. The system 705 directly interacts with the SCP of the home Intelligent Network. The home Intelligent Network SCP, in turn, invokes the apply charging mechanism and facilitates real-time and fraud-free charging of the Intelligent Network roaming subscribers 701. The systems 705 of the visiting network and 703 of the home network maintain the link with the home Intelligent Network SCP using visiting network MSC 702 and home network MSC 708. In one variation, the routing of the call is completed on the basis of a service descriptor. The service descriptor contains information about the services subscribed by the subscriber 701. Using this service subscription information, call routing is given a 'go' signal or further routing and processing is rejected.

With respect to a MT call with In-roamers, the call lands at the Intelligent Network home MSC 708, and depending on the roaming subscriber's location information from the home Intelligent Network HLR/VLR 706, the call is patched to the visitor MSC 702 via the system 705. The system 705 performs the appropriate protocol conversion pertaining to the signaling messages. The Intelligent Network MSC 702 invokes a "follow-me" function for the call control. In one variation, the MT call is fully controlled by the home Intelligent Network SCP.

For MO calls and MT Calls with out-roamers, the system 705 acts as an SCP, and facilitates real-time charging by invoking apply charging mechanism. This functionality helps the visited Intelligent Network 710 accomplish fraud-free charging of the roaming subscriber 701. The routing of the call is performed on the basis of the service descriptor. In one variation, the MT call is fully controlled by the home Intelligent Network SCP.

Figure 4:
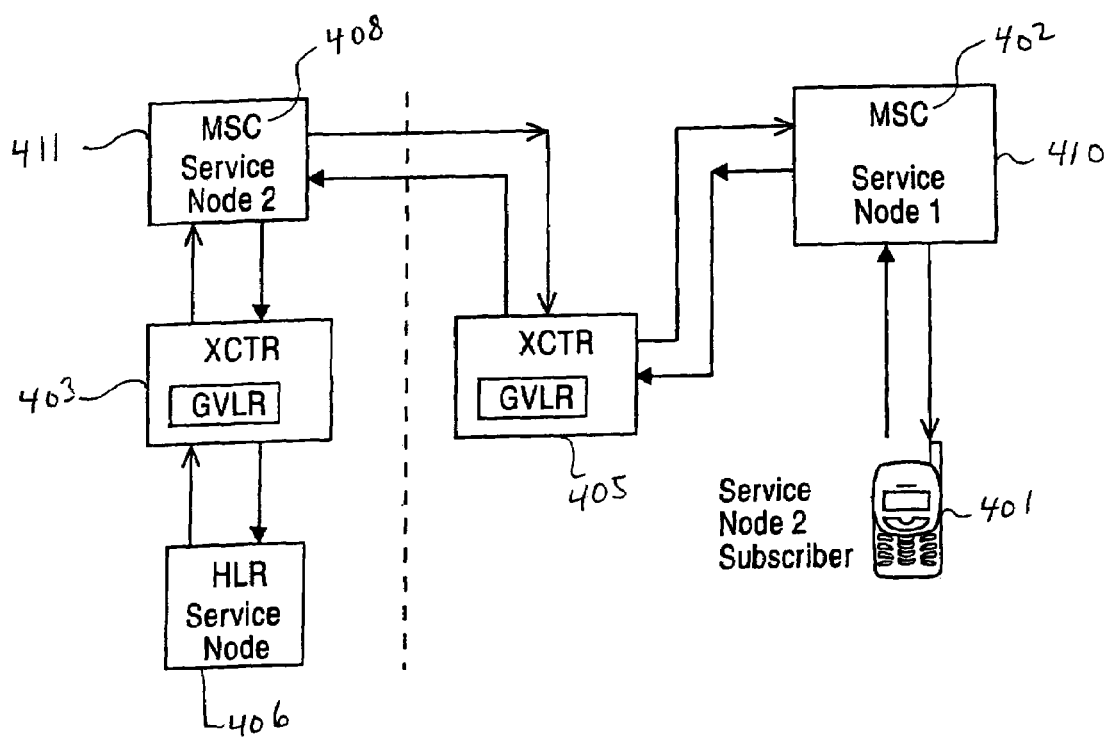
FIG. 4 illustrates a schematic of the deployment and functioning of the system, wherein the home network is a Service Node Network and the visiting network is a Service Node Network in accordance with one embodiment of the present invention.

In another scenario, shown in FIG. 1 as box 110 and depicted in FIG. 4, the home network 411 is a Service Node Network with the system 403, and the visited network 410 is a Service Node Network equipped with the system 405.

For the location update process, the service node subscriber 401 communicates a signal to a Service Node Network MSC 402 which then forwards the signal to the system 405. The system 405 forwards the request to the home Service Node Network MSC 408 so that it can obtain subscriber information from the service node home HLR 406 using system 403. The signal is then reversed and sent back to the visiting MSC 402.

When an in-roamer makes a MO call from the Service Node Network 408, the call is processed by the Service Node MSC 402 and the system 405. The system 405 interacts with the system 403 of the home Service Node Network 410 via the home MSC 408. The home system 403 acts as a SCP and invokes the apply charging mechanism, thereby approving and facilitating real-time and fraud-free charging of the service node roaming subscribers 401 by the visiting system 410. The system 405 maintains a link with the home Service Node Network system 403, which, as stated, acts as a SCP in this scenario.

For a MT call with in-roamers, the call is processed and is directed to the Service Node Network home MSC 408, and depending on the roaming subscriber's 401 location information from the home service node HLR/VLR 406, the call is patched to the visiting MSC 402 via the systems 405 of the visiting network and 403 of the home network. Systems 405 and 403, respectively, perform the appropriate protocol conversion pertaining to the signaling messages. Moreover, the Service Node MSC 402 invokes the "follow-me" function for the call control. The MT call is fully controlled by the home Service Node SCP.

For MO calls and MT calls with out-roamers, the systems 403 and 405 act as a SCP and help in real-time charging by invoking apply charging. This functionality helps the visited Service Node Network 410 accomplish fraud-free charging of the roaming subscriber 401. In one variation, the MT call is fully controlled by the home Service Node Network system 403 which acts as the SCP.

Figure 3:
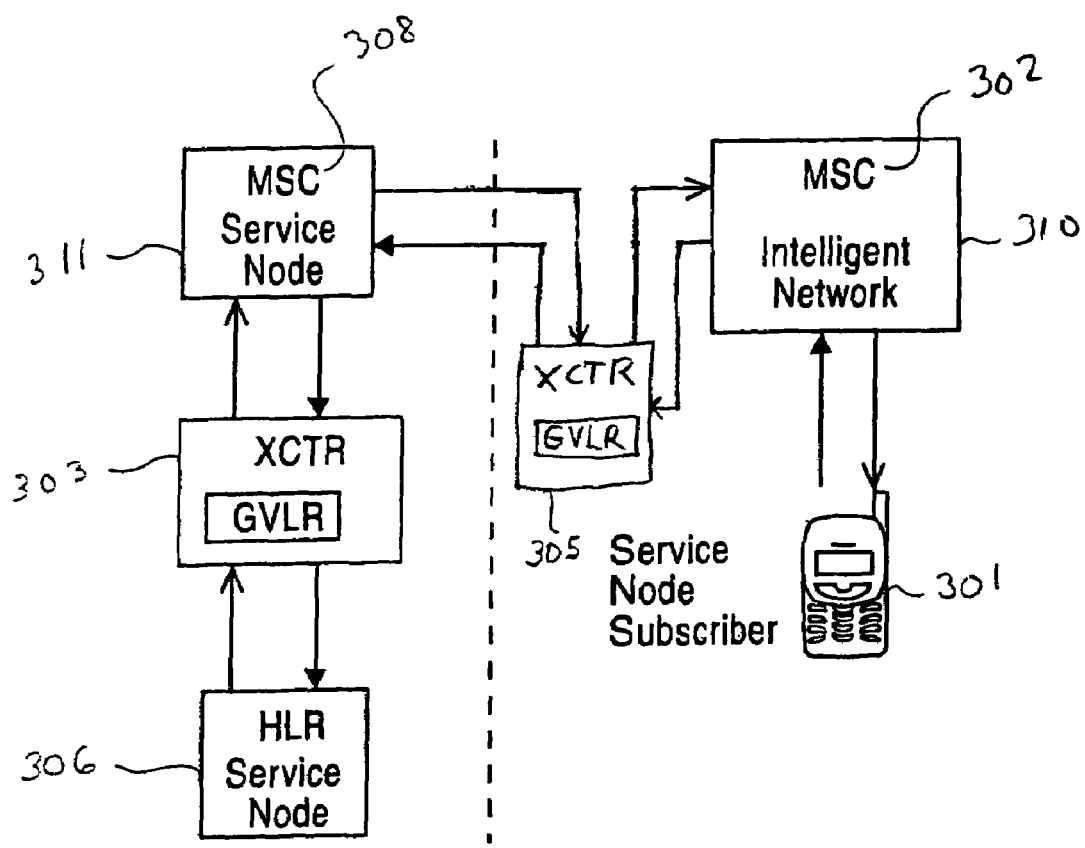
FIG. 3 illustrates a schematic of the deployment and functioning of the system, wherein the home network is a Service Node Network and the visiting network is an Intelligent Network in accordance with one embodiment of the present invention.

In another scenario, as represented in FIG. 3, the home network 311 is a Service Node Network equipped with the system 303, and the visited network 310 is an Intelligent Network equipped with the system 305. This scenario is also shown as box 109 in FIG. 1.

For the location update process, the Service Node subscriber 301 transmits a signal including a request to the Intelligent Network MSC 302. The signal is relayed by MSC 302 to the system 305. The system 305 forwards the signal to the home Service Node Network MSC 308 which obtains subscriber information from the Service Node Network home HLR 306. The signal is sent back through the same pipeline (in reverse) and is received by the MSC 302 which processes the received signal.

When an in-roamer makes a MO call from the visited Intelligent Network, the call is transmitted from the Intelligent Network MSC 302 to the system 305 which interacts with the system 303 of the home Service Node Network 310 via the MSC 308. The system 303 acts as a SCP and invokes the apply charging mechanism. This invocation facilitates real-time and fraud-free charging of the Service Node roaming subscriber 301. In one variation, the routing of the call is done on the basis of service descriptor. In another variation, the system 305 maintains a link with the home Service Node Network system 303 which serves as a SCP.

For MT calls with in-roamers, the call by the subscriber 301 transmits to the Service Node Network MSC 308. Depending on the roaming subscriber's 301 location information as processed by the home Service Node Network HLR/VLR 306, the call is patched to the visitor MSC 302 via the system 305. The systems 305 and 303, respectively, perform the appropriate protocol conversion pertaining to the signaling messages. The Intelligent Network MSC 302 invokes the "follow-me" function for the call control. In one variation, the MT call is fully controlled by the home Service Node Network SCP.

For MT and MO calls with out-roamers, the system 303 acts as a SCP to facilitate real-time charging by invoking apply charging, which functionally helps the visited Intelligent Network 310 accomplish fraud-free charging of the roaming subscriber 301. The routing of the call is done on the basis of service descriptor. In one variation, the MT call is fully controlled by the home system 303, which acts as the SCP.

Figure 6:
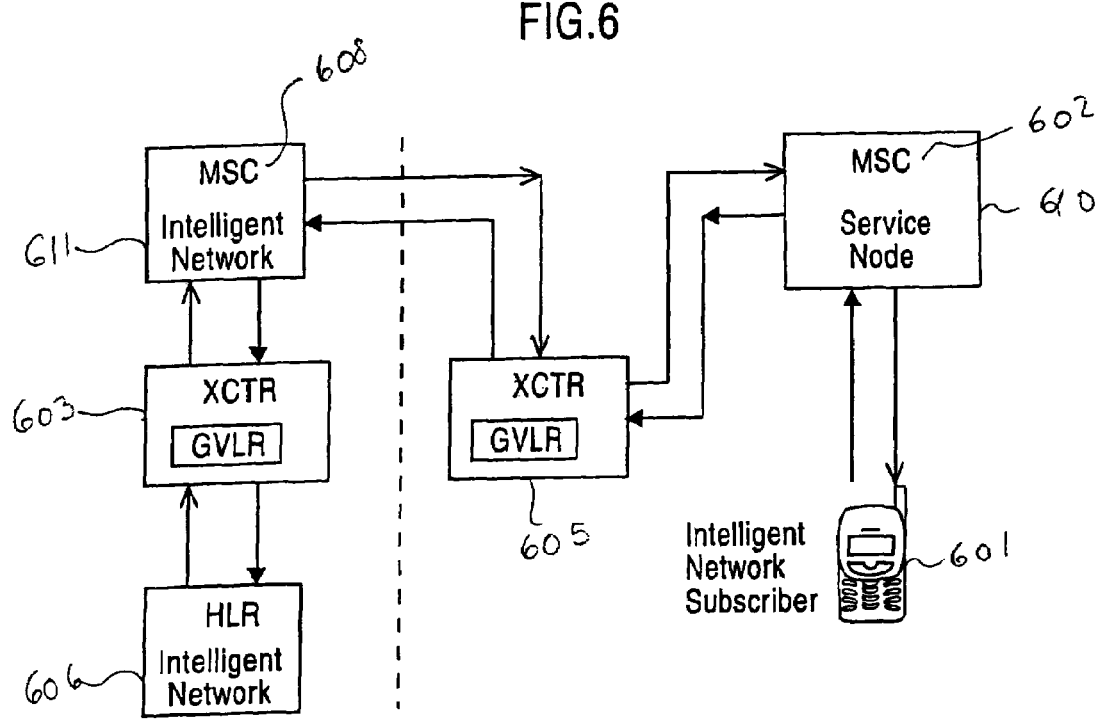
FIG. 6 illustrates a schematic of the deployment and functioning of the system, wherein the home network is an Intelligent Network and the visiting network is a Service Node Network in accordance with one embodiment of the present invention.

An additional scenario, as presented in FIG. 6, is one in which the home network 611 is an Intelligent Network equipped with the system 603 and the visited network 610 is a Service Node Network equipped with the system 605.

For the location update process, the MSC 602 of the Service Node Network receives a communication request signal from the Intelligent Network subscriber 601. The MSC 602 forwards the request to the system 605 which further transmits the request to the home Intelligent Network MSC 608. The MSC 608 communicates with the HLR 606 via the system 603 to obtain the subscriber information, which is transmitted to the MSC 602.

Whenever the in-roamer makes the MO call from the Service Node Network 610, the call is transmitted to the Service Node MSC 602 and then to the system 605. The system 605 interacts with the home Intelligent Network system 603. The home system 603 acts as a SCP and invokes the apply charging mechanism to facilitate real-time and fraud-free charging of the Intelligent Network roaming subscribers 601. The routing of the call is done on the basis of the service descriptor. The system 605 maintains a link with the home Intelligent Network system 603 which acts as a SCP in this case.

With respect to a MT call by an in-roamer, the call is received by the Intelligent Network home MSC 608. Depending on the roaming subscriber's 601 location information from the Intelligent Network HLR/VLR 606, the call is connected to the visitor MSC 602 via the system 603 which conducts the appropriate protocol conversion pertaining to the signaling messages. The Service Node Network MSC 602 invokes the follow-me function for the call control. In one variation, the MT call is fully controlled by the home Intelligent Network SCP.

For both MT and MO call out-roamers, the system 603 acts as a SCP and helps real-time charging by invoking apply charging, which allows the visited Service Node Network 610 to accomplish fraud-free charging of the roaming subscriber 601. The routing of the call is done on the basis of service descriptor. In one variation, the MT call is fully controlled by the home Intelligent Network system 603, which acts as SCP.

Figure 5:
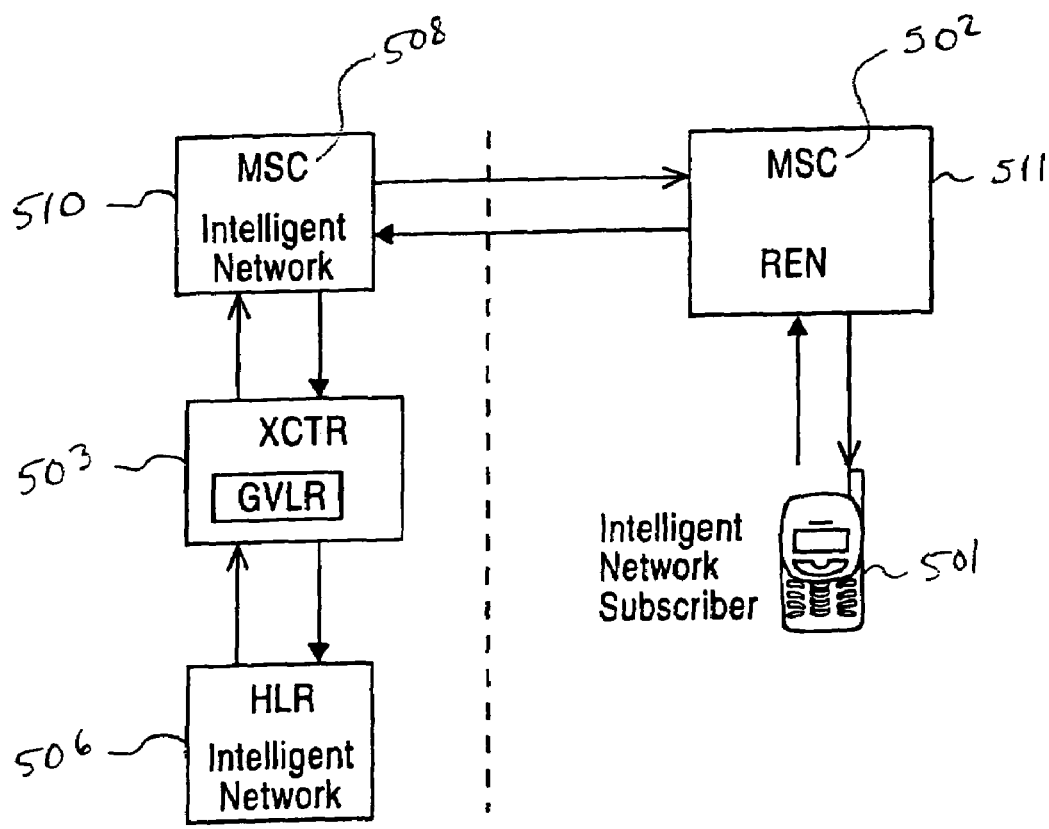
FIG. 5 illustrates a schematic of the deployment and functioning of the system, wherein the home network is an Intelligent Network and the visiting network is a Roaming Enabled Network in accordance with one embodiment of the present invention.

In last exemplary scenario, as presented in FIG. 5, the home network 510 is an Intelligent Network having the system 503 and the visited network 511 is a Roaming Enabled Network. This scenario is also illustrated as box 104 or box 107 in FIG. 1.

For the location update process, the subscriber 501 transmits a request signal to the roaming MSC 502 which passes on the request to the MSC 508 and then to the system 503 of the home network 510. The system 503 processes the information and forwards a subsequent request to the service node HLR 506 to obtain the subscriber information. System 503 converts the information into roaming enabled technology subscriber information. This information is then transmitted to and received by the Roaming Enabled Network MSC 502.

When the in-roamer makes a MO call from the Roaming Enabled Network 511, the call is routed to the home system 503. The system 503 then functions as the SCP. The system 503 activates the apply charging mechanism and facilitates real-time, fraud-free charging of the Intelligent Network roaming subscriber 501. The system 503 maintains the link with the Roaming Enabled Network MSC 502.

For MT calls by in-roamers, the call is received by the Intelligent Network home MSC 508, and depending on the roaming subscriber's 501 location information from the home Intelligent Network HLR/VLR 506, the call is directed to the visitor MSC 502 via the system 503. The system 503 performs the protocol conversion of the Intelligent Network messages to the corresponding roaming enabled technology messages.

For both MT and MO calls with out-roamers, the system 503 acts as a SCP. Thus, the system 503 permits real-time charging by invoking 'apply charging mechanism'. This functionality helps the visited Roaming Enabled Network 510 to accomplish fraud-free charging of the roaming subscriber 501.

The system first receives the messages, understands the source and target network type either using information available in the message or using the datastore of the system. The system converts the messages from source network type to target network by mapping each message with required parameters. In the event the roaming network does not possess SCP functionality, SCP functionality is provided by the system of the home network.

Figure 12:
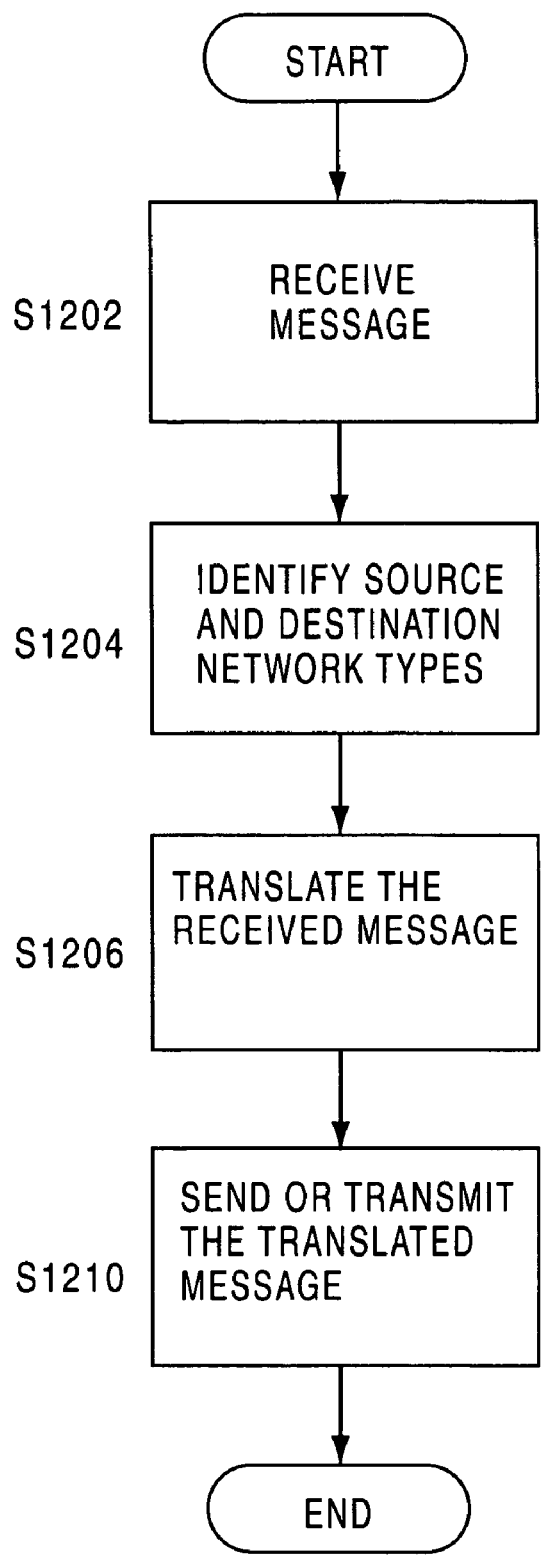
FIG. 12 illustrates an exemplary flowchart of the processes used in one embodiment of the present invention.
Figure 13:
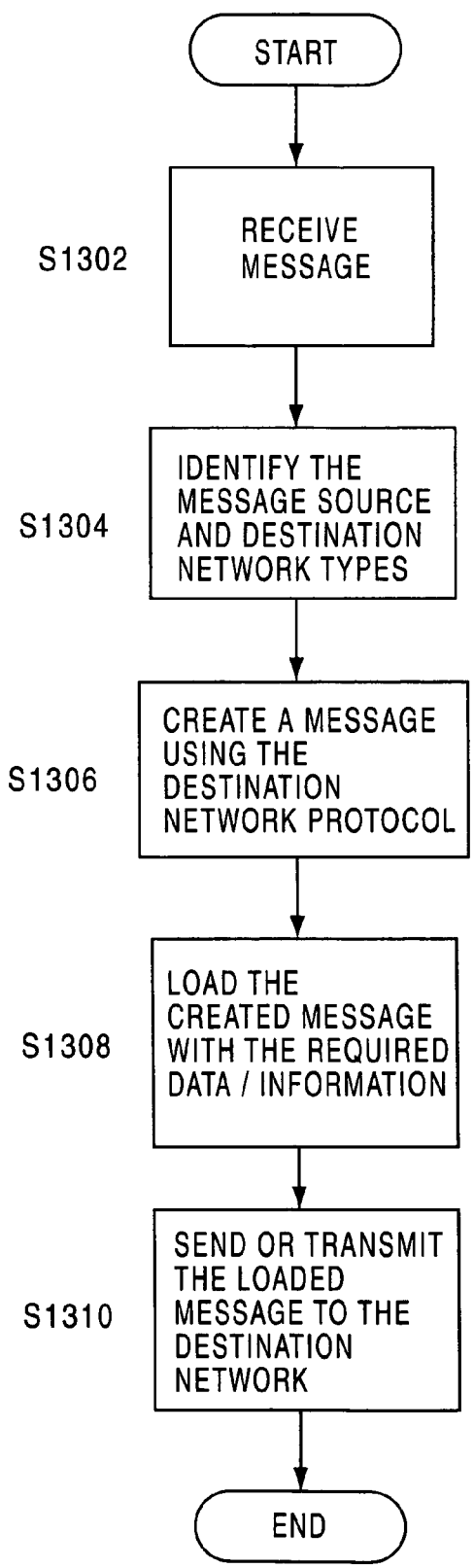
FIG. 13 illustrates an exemplary flowchart of the processes used in a second embodiment of the present invention.

Two examples of this process are illustrated in FIGS. 12 and 13. In these figures, a message that originated with the subscriber, the home network, or the roaming network is received by the system in either step S1202 or step S1302.

Thereafter, the system identifies the message source and destination network type in either step S1204 or step S1304. The network-type identification may be based on the message contents or address(es). Alternatively the network-type identification may be found using a database or data store.

Next, the system translates the received message from the message format or protocol used by the source network to the format or protocol used by the destination network in step S1206. This step uses the source and destination network type identified in step S1204. The system may translate or convert the message from source network type to the destination or target network by mapping each message with required parameters.

Alternatively, the system may create a new message using the destination network protocol in step S1306. This step destination network type identified in step S1304. Thereafter, the created message is loaded in step S1308. This loading process inserts the correct or proper data into the fields of the created message. The loaded data may be extracted from the source message or obtained from a database or data store.

Thereafter, the translated message and the loaded message are sent or transmitted to the destination network in steps S1210 and S1310, respectively.

In one embodiment this system can be integrated with either the home network or the visiting network or with both.

Embodiments of the present invention provide fully scaleable, intelligent protocol conversion systems and methods, and offers a robust roaming solution to the mobile communications industry by allowing delivery of roaming enabled services to non-Roaming Enabled Networks.

The system and method of the present invention offer a number of advantages in view of conventional systems and services. For instance, the method and system facilitate prepaid roaming across all roaming compliant networks, including Service Node Networks and Intelligent Networks. Additionally, with the system of the present invention, the provider having an Intelligent Network or Service Node Network infrastructure is not required to convert or shift subscribers into a new system to become roaming enabled. The system and method of the present invention act as roaming signalling relay system, without requiring wholesale conversion of network, and thereby avoiding significant (i.e. investment in capital), for instance. Furthermore, the method and system of the present invention are capable of handling both mobile originated and mobile terminated calls. Another advantage of the present invention is that it can optionally implement the roaming functionality of the "apply charging" mechanism concept, which also helps reduce roaming fraud.

Example Processing System Components And Functionality

Figure 11:
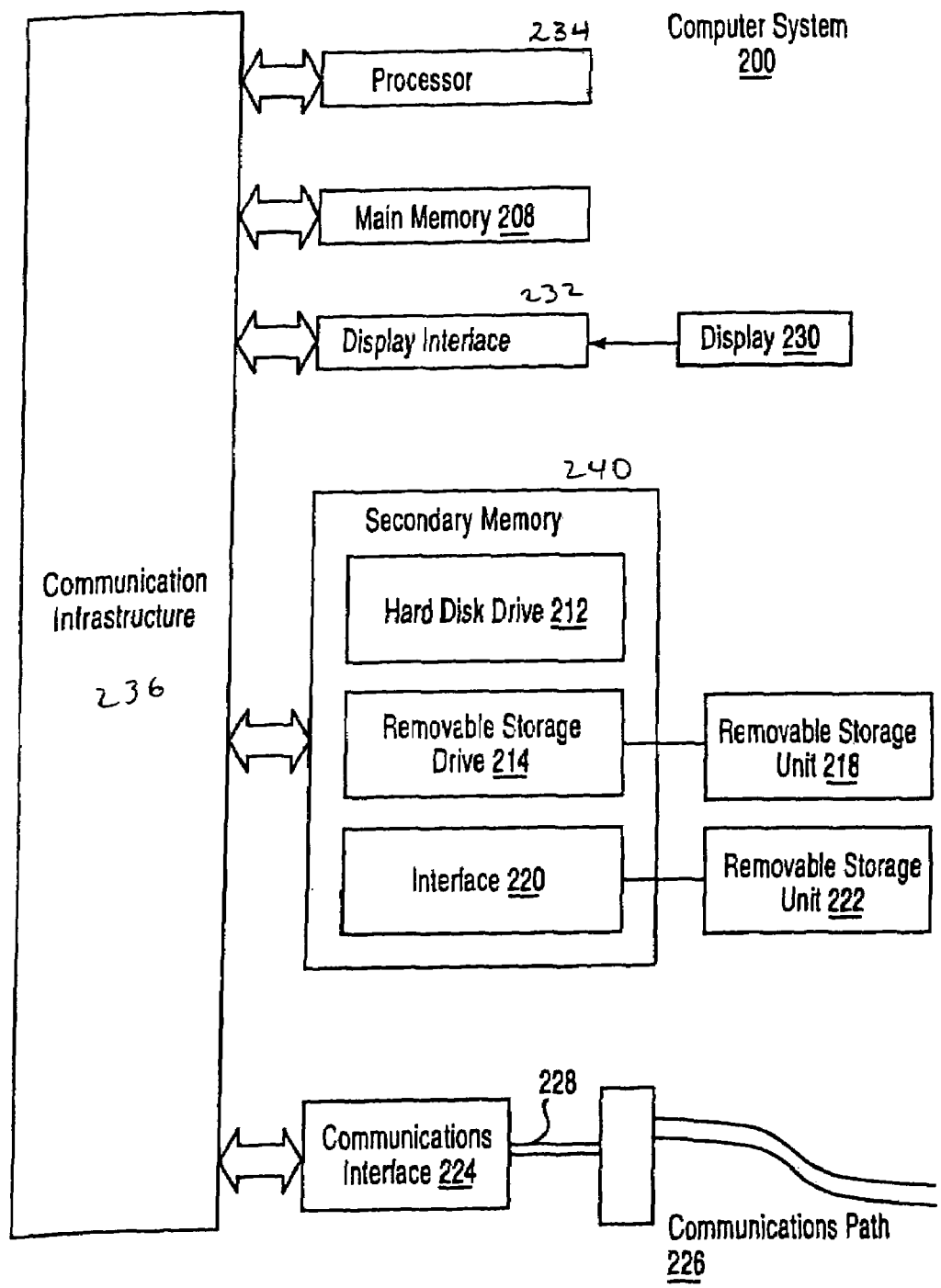
FIG. 11 presents an exemplary system diagram of various hardware components and other features for use in accordance with an embodiment of the present invention.

The present invention may be implemented using hardware, software, or a combination thereof and may be implemented in one or more computer systems or other processing systems. In one embodiment, the invention is directed toward one or more computer systems capable of carrying out the functionality described herein. An example of such a computer system is shown in FIG. 11.

Computer system 200 includes one or more processors, such as processor 234. The processor 234 is connected to a communication infrastructure 236 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 232 that forwards graphics, text, and other data from the communication infrastructure 236 (or from a frame buffer not shown) for display on the display unit 230. Computer system 200 also includes a main memory 238, preferably random access memory (RAM), and may also include a secondary memory 240. The secondary memory 240 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 240 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 1024. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 1028 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels.

In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 238 and/or secondary memory 240. Computer programs may also be received via communications interface 224. Such computer programs, when executed, enable the computer system 200 to perform the features of the present invention, as discussed herein. In particular, the computer programs, when executed, enable the processor 234 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 234 causes the processor 234 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While there has been described what are at present considered to be preferred embodiments of the present invention, it will be understood that various modifications may be made thereto, and it is intended that the appended claims cover all such modifications as fall within the true spirit and scope of the invention. Other modifications will be apparent to those skilled in the art.

What is claimed is:

1. A method for enabling roaming between wireless networks, the method comprising:
   receiving a first message associated with a request for a device to communicate with a source network;
   selecting a source network type among a plurality of predetermined source wireless network types and a destination network type among a plurality of predetermined destination wireless network types for the received first message based on information available in the first message or in a database;
   translating the received first message from a message format of the selected source network type to a message format of the selected destination network type;
   transmitting the translated first message to a destination network; and
   receiving a second message in response to the transmitted translated first message, the second message indicating whether the device is permitted to communicate with the source network.

2. The method of claim 1, wherein the source network type is selected from the group consisting of roaming-enabled networks, intelligent networks and service node networks.

3. The method of claim 1, wherein the destination network type is selected from the group consisting of roaming-enabled networks, intelligent networks and service node networks.

4. The method of claim 1, further comprising:
   functioning as a service control point.

5. The method of claim 1, wherein the received first message relates to a mobile-terminated call.

6. The method of claim 1, wherein the received first message relates to a mobile-originated call.

7. The method according to claim 1, further comprising:
   translating the received second message from the message format of the selected destination network type to the message format of the selected source network type; and
   transmitting the translated second message to the source network.

8. An apparatus for enabling roaming between wireless networks, the apparatus comprising:
   a first receiving device configured to receive a first message associated with a request for a device to communicate with a source network;
   a selecting device configured to select a source network type among a plurality of predetermined source wireless network types and a destination network type among a plurality of predetermined destination wireless network types for the received first message based on information available in the first message or in a database;
   a first translating device configured to translate the received first message from a message format of the selected source network type to a message format of the selected destination network type;
   a first transmitting device configured to transmit the translated first message to a destination network; and
   a second receiving device configured to receive a second message in response to the transmitted translated first message, the second message indicating whether the device is permitted to communicate with the source network.

9. The apparatus of claim 8, wherein the source network type is selected from the group consisting of roaming-enabled networks, intelligent networks and service node networks.

10. The apparatus of claim 8, wherein the destination network type is selected from the group consisting of roaming-enabled networks, intelligent networks and service node networks.

11. The apparatus of claim 8, further comprising:
    a service control device configured to act as a service control point.

12. The apparatus of claim 8, wherein the received first message relates to a mobile-terminated call.

13. The apparatus of claim 8, wherein the received first message relates to a mobile-originated call.

14. A method for enabling roaming between wireless networks, the method comprising:
    receiving a first message associated with a request for a device to communicate with a source network;
    identifying a source network type among a plurality of predetermined source wireless network types and a destination network type among a plurality of predetermined destination wireless network types for the received message based on information available in the first message or in a database;
    creating a first translated message based on the identified destination network type;
    loading the first translated message with required data or information;
    transmitting the first translated message to a destination network; and
    receiving a second message in response to the first translated message, the second message indicating whether the device is permitted to communicate with the source network.

15. The apparatus according to claim 8, further comprising:
- a second translating device configured to translate the received second message from the message format of the selected destination network type to the message format of the selected source network type; and
- a second transmitting device configured to transmit the translated second message to the source network.

16. The method of claim 14, wherein the step of loading the first translated message includes extracting data or information from the received first message and loading at least a portion of the extracted data or information.

17. The method of claim 14, wherein the source network type is selected from the group consisting of roaming-enabled networks, intelligent networks and service node networks.

18. The method of claim 14, wherein the destination network type is selected from the group consisting of roaming-enabled networks, intelligent networks and service node networks.

19. The method of claim 14, wherein the step of loading the first translated message includes obtaining data or information from a data store or database and loading at least a portion of the obtained data or information.

20. The method according to claim 14, further comprising:
- creating a second translated message based on the identified source network type;
- loading the second translated message with required data or information; and
- transmitting the second translated message to the source network.

* * * * *

UNITED STATES PATENT AND TRADEMARK OFFICE
CERTIFICATE OF CORRECTION

PATENT NO.        : 7,428,414 B2
APPLICATION NO.   : 11/025840
DATED             : September 23, 2008
INVENTOR(S)       : Gandarvakottai V Kumar et al.

It is certified that error appears in the above-identified patent and that said Letters Patent is hereby corrected as shown below:

Column 2, line 28, "Si" should read --SI--; and

Column 2, line 32, "Si" should read --SI--.

Signed and Sealed this

Twenty-sixth Day of May, 2009

JOHN DOLL
*Acting Director of the United States Patent and Trademark Office*